United States Patent [19]

Tanishima et al.

[11] Patent Number: 4,816,942
[45] Date of Patent: Mar. 28, 1989

[54] SPRING POWERED TRANSDUCER RETRACTOR MECHANISM FOR DATA TRANSFER APPARATUS

[75] Inventors: Takao Tanishima, Tokyo; Toru Hayashi, Mitaka; Mamoru Ono, Tachikawa, all of Japan

[73] Assignee: Teac Corporation, Tokyo, Japan

[21] Appl. No.: 33,005

[22] Filed: Mar. 31, 1987

[30] Foreign Application Priority Data

Mar. 31, 1986 [JP] Japan .................................. 61-74004
Jan. 26, 1987 [JP] Japan .................................. 62-17101

[51] Int. Cl.$^4$ .......................... G11B 5/55; G11B 21/08
[52] U.S. Cl. .................................. 360/78.12; 360/75; 360/105
[58] Field of Search ...................... 360/75, 78, 103, 105

[56] References Cited

U.S. PATENT DOCUMENTS

| | | | |
|---|---|---|---|
| 3,668,666 | 6/1972 | Heffernam | 360/105 |
| 4,139,874 | 2/1979 | Shiraishi | 360/105 |
| 4,593,329 | 6/1986 | Hayakawa | 360/75 |
| 4,686,595 | 8/1987 | Bryer | 360/105 |
| 4,706,142 | 11/1987 | Hattori et al. | 360/105 |

FOREIGN PATENT DOCUMENTS 60-40066  3/1985  Japan .

Primary Examiner—Alan Faber
Assistant Examiner—David L. Robertson
Attorney, Agent, or Firm—Woodcock Washburn Kurtz Mackiewicz & Norris

[57] ABSTRACT

In a data transfer apparatus such as a Winchester disk drive wherein a transducer or transducers fly over a magnetic disk surface or surfaces during data transfer therewith, a retractor mechanism is provided which coacts with a transducer positioning mechanism for causing the transducer to land on a head landing track disposed radially and inwardly from a series of concentric data storage tracks on the disk, as when the apparatus is electrically turned off. The retractor mechanism includes a spring or like energy storage element in which energy is stored when, with the apparatus powered on, the transducer is first transported by the positioning mechanism from the head landing track to the outermost home track on the disk for initialization. The spring is locked, as under the force of a solenoid, against the release of the stored energy during the subsequent run of data transfer, making it possible for the positioning mechanism to transport the transducer from track to track without being loaded by the deflected spring. When the apparatus is powered off, the solenoid unlocks the spring for releasing the stored energy and hence for returning the transducer to the landing track.

11 Claims, 9 Drawing Sheets

SPRING POWERED TRANSDUCER RETRACTOR MECHANISM FOR DATA TRANSFER APPARATUS

BACKGROUND OF THE INVENTION

Our invention relates to apparatus for data transfer with disklike record media in general and, in particular, to such apparatus of the kind known as a Winchester drive wherein a relatively rigid magnetic disk or disks are semipermanently mounted on a drive spindle and normally held in contact with a magnetic transducer or transducers, the latter moving out of contact with the disk or disks upon rotation thereof for data transfer. Still more specifically, our invention pertains to a mechanism for use in such apparatus for retracting the transducer or transducers from the data storage region to the non-storage region of the disk or disks when the apparatus is electrically turned off.

The Winchester drive disk is known wherein at least one, usually two or more, relatively rigid magnetic disks and associated transducers are semipermanently enclosed in a dustproof housing for data transfer in a dustfree environment. The transducers are spring biased into contact with the magnetic disks. Upon rotation of the disks the streams of air created thereby cause the transducers to move out of contact with the disks again the bias of the springs. The transducers write or read data on or from the disks while being thus spaced a minimal distance therefrom, so that during the process of data transfer, the transducers and disks are not subjected to any frictional wear.

However, both at the beginning and end of each run of data transfer, the transducers must slide over the disks, with the possibility of ruining the disks or being ruined thereby. One conventional solution to this problem is found in Hayakawa U.S. Pat. No. 4,593,329 assigned to the assignee of our instant application. This patent teaches how to electrically control the stepping motor, at the end of each run of data transfer, so as to retract the transducer radially toward the center spindle from the storage region of the magnetic disk. The transducer lands on the disk, only after it has been retracted. Japanese Laid Open Utility Model Application No. 60-40066 also teaches to hold the transducer retracted on the magnetic disk when the latter is out of rotation.

We object to both of these known solutions because the transducer is retracted by the stepping motor or equivalent electric transducer positioning motor. Such a motor becomes deenergized, of course, when the disk drive is unexpectedly powered off, as in the event of a power failure or other accident. Then the transducer will slide over and land on the data storage region of the magnetic disk. An additional objection is that both known solutions require the production of a control signal for transducer retraction, making the circuitry of the disk drive complex and expensive.

SUMMARY OF THE INVENTION

We have hereby found out how to retract a transducer or transducers away from the data storage region of a record medium or media in a Winchester disk drive or like data transfer apparatus. This retraction occurs both at the end of each session of data transfer and when the apparatus is unexpectedly powered off.

Briefly, our invention concerns a data transfer apparatus of the type including a transfer for data transfer with a disklike record medium having a data storage region and a non-storage region arranged concentrically on one face thereof, and a transducer positioning mechanism for transporting the transducer across the storage and non-storage regions of the record medium. More specifically, our invention pertains to a transducer retractor mechanism coacting with the transducer positioning mechanism for retracting the transducer onto the non-storage region of the record medium whenever the data transfer apparatus is electrically turned off. The transducer retractor mechanism comprises energy storage means including an energy storage element and coupled, via clutch means, to the transducer positioning mechanism for storing energy in the energy storage element when the transducer is moved from the non-storage region to the storage region of the record medium. Locking means is provided which, when the transducer is moved from the non-storage region of the record medium to a preassigned position on the storage region thereof, acts on the said energy storage means for locking the same against the release of the stored energy. The noted clutch means permits the transducer positioning mechanism to transport the transducer across the storage region of the record medium as long as the locking means is acting on the energy storage means. Also included is means for unlocking the energy storage means from the locking means and for allowing said energy storage means to act on the transducer positioning mechanism, via the clutch means, for returning the transducer from the storage region to the non-storage region by using the energy in the energy storage element.

Typically, the energy storage element takes the form of a spring such as a flat spiral spring or coiled torsion spring. The energy storage means comprising this spring may be coupled, via the clutch means, to the output shaft of a head positioning motor which usually is of the electric stepping type.

As is well known, in a Winchester disk drive or like data transfer apparatus, the transducer is transported by the head positioning motor from the non-storage region of the magnetic disk to a home track on its storage region for initialization. Being coupled to the motor output shaft, the spring undergoes deflection and so stores energy during the motor rotation for transducer position initialization. The stored energy is saved by the locking means and isolated from the positioning motor during the subsequent process of data transfer between the transducer and the magnetic disk. Then, when the apparatus is powered off, either upon completion of the data transfer or by a power failure or any other accident, the energy storage means is unlocked, thus causing the spring to release the stored energy. This released energy acts on the positioning motor shaft for retracting the transducer from the storage region to the non-storage region of the magnetic disk. The unlocking means may comprise a solenoid or similar electric actuator which loses power along with the complete apparatus.

It should be appreciated that the transducer is retracted by mechanical, rather than electric, energy. The retraction of the transducer can therefore be smoothly accomplished even when the apparatus is powered off accidentally or by routine.

Because of its compact construction, the transducer mechanism can be readily incorporated with the transducer positioning mechanism without much space requirement. It does not affect, in any way, the usual data transfer operations, including transducer position initialization. It also does not require any modification of the existing electric circuitry of the apparatus.

The above features and other advantages of our invention will become more apparent, and the invention itself will best be understood, from a study of the following description and claims. Reference should be made to the attached drawings which show some preferred embodiments of the invention.

DESCRIPTION OF THE PREFERRED EMBODIMENTS

1. Disk Drive Construction

Figure 1:
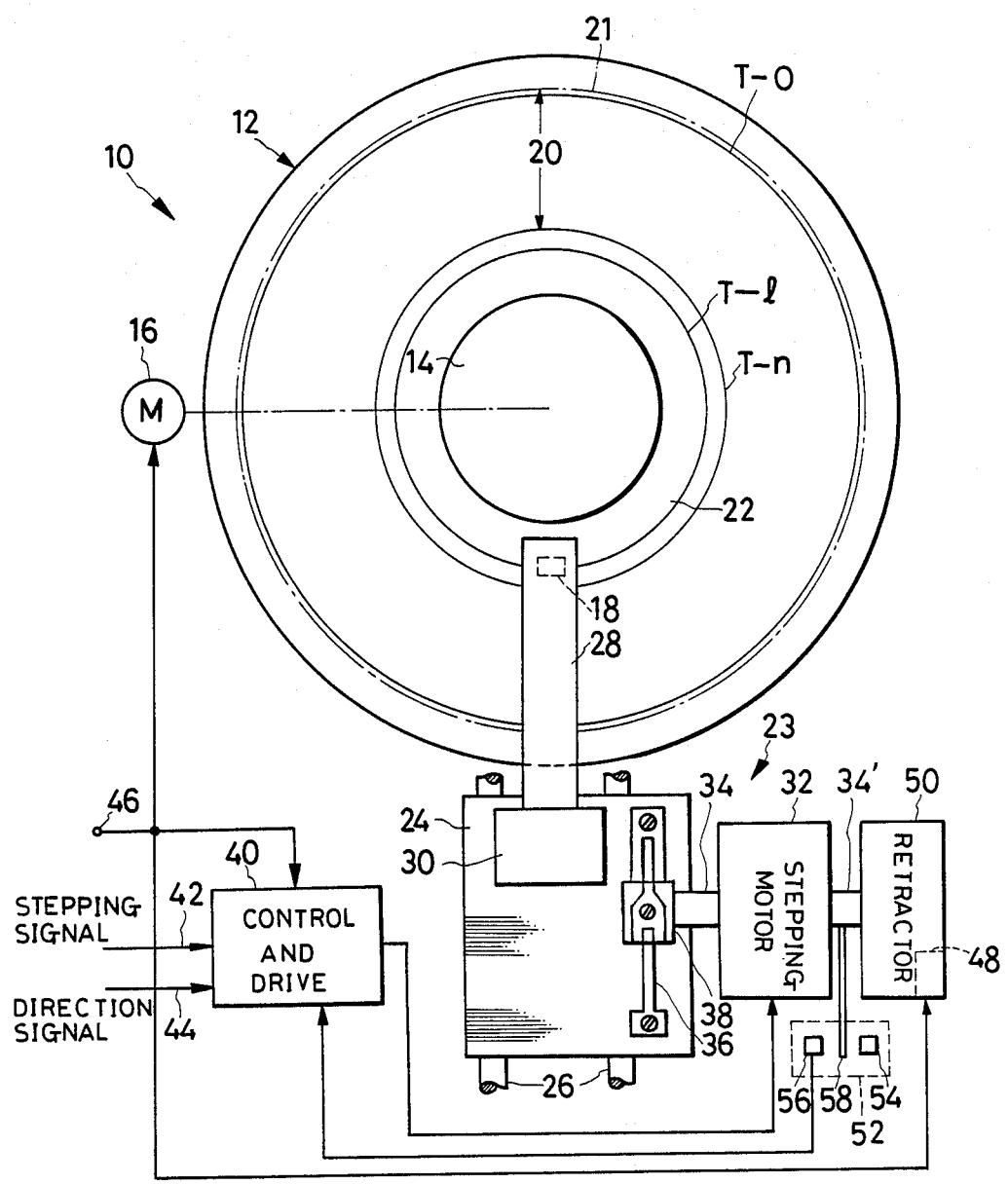
FIG. 1 is a diagrammatic representation of the magnetic disk, transducer positioning mechanism and associated electric circuitry of a Winchester disk drive to which our invention finds application, the disk drive being provided with a transducer retractor mechanism, herein shown in block form, in accordance with our invention.

We will now describe the transducer retractor mechanism of our invention as adapted specifically for use in a Winchester disk drive shown diagrammatically in FIG. 1 and therein generally designated 10. The Winchester drive 10 has two or more relatively rigid magnetic disks 12, one seen, coaxially and rigidly mounted to a drive hub 14 which in turn is coupled directly to a disk drive motor 16. Typically, each magnetic disk 12 is double sided; that is, both of its opposite faces are used for storing data. Thus, although FIG. 1 shows only one transducer or magnetic head 18, we understand that two or more pairs of such transducers are provided for data transfer with the opposite faces of the magnetic disks 12. In its simplest form, however, the data transfer apparatus in accordance with my invention has only one disklike record medium, and only one of its opposite faces is used for data transfer with a single transducer.

Each magnetic disk 12 has many individually addressable data storage tracks formed concentrically on each face thereof for storing data to be read or written by the associated transducer 18. In FIG. 1 we have shown only the outermost one T-0 (Track Zero) and innermost one T-n of these data storage tracks for illustrative convenience. The reference numeral 20 indicates a data storage region covering all the data storage track T-0 through T-n. It will be noted that the outer boundary 21 of the data storage region 20, indicated by the broken line circle, is located some distance radially and outwardly of Track Zero, because the transducer 18 must be movable to that boundary at the time of initialization or recalibration, as will become apparent as the description proceeds.

Each magnetic disk 12 has a non-storage or blank region 22 located radially and inwardly from the storage region 20. The non-storage region 22 has provided thereon an additional track T-l, herein called a head landing track, where no data are to be written but where the associated transducer 18 is to land when the disk is out of rotation. Our invention enables the transducer 18 to automatically return to and land on this landing track T-l when the disk drive 10 is powered off.

All the pairs of transducers 18 are jointly movable radially and in parallel to the surfaces of the associated magnetic disks 12 for accessing the data storage tracks T-0 through T-n as well as the landing track T-l. Conventionally employed for such travel of the transducers 18 is a transducer positioning mechanism 23 comprising a carriage 24 movable radially across the tracks of the magnetic disks 12 along a pair of guide rods 26. The transducers 18 are mounted on the distal ends of respective cantilever springs 28 which are proximally anchored to a column 30 on the carriage 24. The transducer positioning mechanism 23 further comprises a bidirectional electric motor 32 of the known stepping type. The stepping motor 32 has an output shaft 34 coupled to the carriage 24 via a motion translating mechanism herein shown as a slotted steel belt 36. Wound around a pulley 38 on the stepping motor output shaft 34, the steel belt 36 has its opposite ends affixed to the carriage 24, whereby the bidirectional, stepwise rotation of the stepping motor is translated into the linear incremental travel of the carriage 24 and hence of the transducers 18 back and forth across the data storage tracks on the magnetic disks 12. The steel belt 36 is fastened to the pulley 38 with a threaded fastener element, not shown, as the stepping motor 32 needs to rotate less than 360 degrees for the full stroke of the transducers 18 across the storage and non-storage regions 20 and 22 of the magnetic disks 12.

Normally, or when the magnetic disks 12 are not rotating, the cantilever springs 28 bias the pairs of transducers 18 into contact with the opposite faces of the associated magnetic disks. When the magnetic disks are rotating, the air streams created thereby cause the transducers 18 to move out of contact therewith against the forces of the cantilever springs 28 as the disks pick up speed to a certain definite percentage of a predefined maximum speed (e.g. 3600 rpm). Data transfer between magnetic disks 12 and transducers 18 take place while the transducers are thus flying over the disks revolving at the maximum speed.

The stepping motor 32 of the transducer positioning mechanism 23 is electrically connected to a control and drive circuit 40 thereby to be driven in a controlled manner. Usually, as is well known to the specialists, the Winchester drive is a slave unit under the control of master equipment comprising a central processor unit. The motor control and drive circuit 40 is coupled to the master equipment, not shown, for inputting a stepping signal and a stepping direction signal by way of lines 42 and 44. In response to these input signals the motor control and drive circuit 40 energizes the stepping motor 32 for moving the transducers 18 in the required direction and the required number of track pitch distances with respect to the magnetic disks 12.

A supply terminal 46 is connected to both the disk drive motor 16 and the stepping motor control and drive circuit 40. Also coupled to the supply terminal 46, is a solenoid 48 included in a transducer retractor mechanism 50, as shown in block form in FIG. 1. This configuration forms the gist of our invention. The transducer retractor mechanism 50 is coupled to a rearward (rightward as viewed in FIG. 1) extension 34' of the stepping motor output shaft 34. The supply terminal itself is fed from the unshown master equipment. Accordingly, when power is fed to the supply terminal 46, not only are the magnetic disks 12 set into rotation, but also the solenoid 48 becomes energized. With the solenoid 48 thus energized, the retractor mechanism 50 permits the positioning mechanism 23 to transport the transducers 18 away from the landing tracks T-1 to the home tracks T-0 on the magnetic disks 12 for initialization.

After a preassigned time interval from the moment of power delivery, the stepping motor control and drive circuit 40 commences this initialization of the transducer position. In order to enable the control and drive circuit 40 to control the transducer position initialization, a known Track Zero sensor 52 is electrically connected thereto. This sensor 52 can be composed of the familiar combination of a light source, such as a light emitting diode (LED) 54, and a photodetector, such as a phototransistor 56. Mounted to the stepping motor shaft extension 34', a photointerrupter 58 periodically intervenes between LED 54 and phototransistor 56 with the rotation of the stepping motor 32. During initialization the stepping motor 32 rotates in a direction required for moving the transducers 18 radially and outwardly from the center of the magnetic disks 12. When the transducers 18 reach the home tracks, the control and drive circuit 40 responds to the output signal of the Track Zero sensor 52 for stopping the rotation of the stepping motor 32.

2. Transducer Retractor Mechanism

The transducer retractor mechanism 50 acts concurrently with the transducer positioning mechanism 23 to hold the transducers 18 locked on the landing tracks T-1 when the disk drive 10 is not powered. Upon delivery of power to the disk drive 10, the retractor mechanism 50 permits the positioning mechanism 23 to transport the transducers 18 away from the landing tracks and to initialize them on the home tracks T-0. Furthermore, when the disk drive 10 is powered off upon completion of a desired run of data transfer, the retractor mechanism 50 causes the positioning mechanism 23 to return the transducers 18 to the landing tracks T-1.

Figure 2:
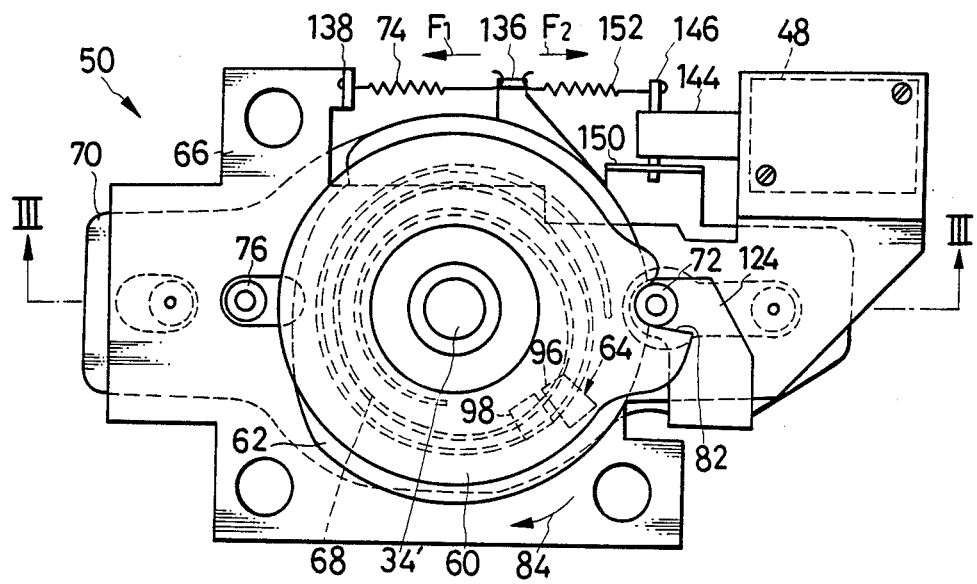
FIG. 2 is a detailed plan view of the transducer retractor mechanism of FIG. 1, shown in a state when the transducer is retracted and locked on the non-storage region of the magnetic disk as in FIG. 1.
Figure 3:
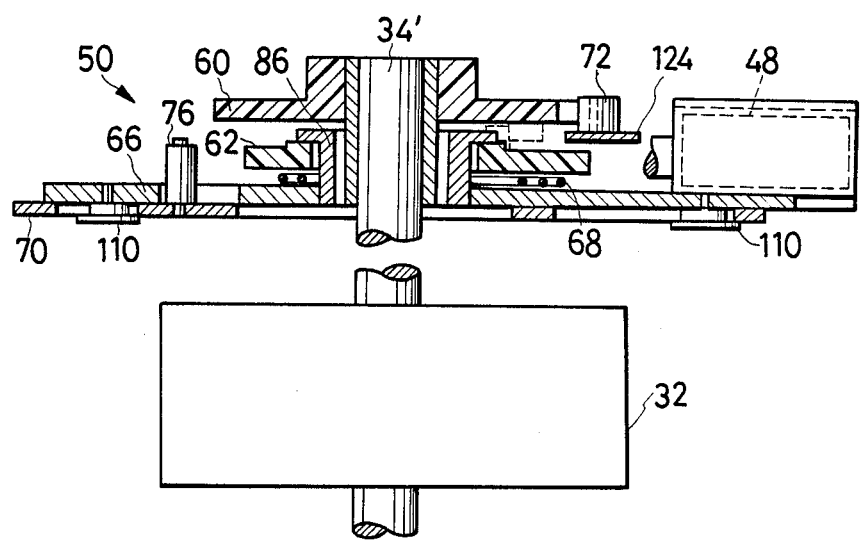
FIG. 3 is a section through the retractor mechanism, taken along the line III—III in FIG. 2 and shown together with the head positioning motor.
Figure 4:
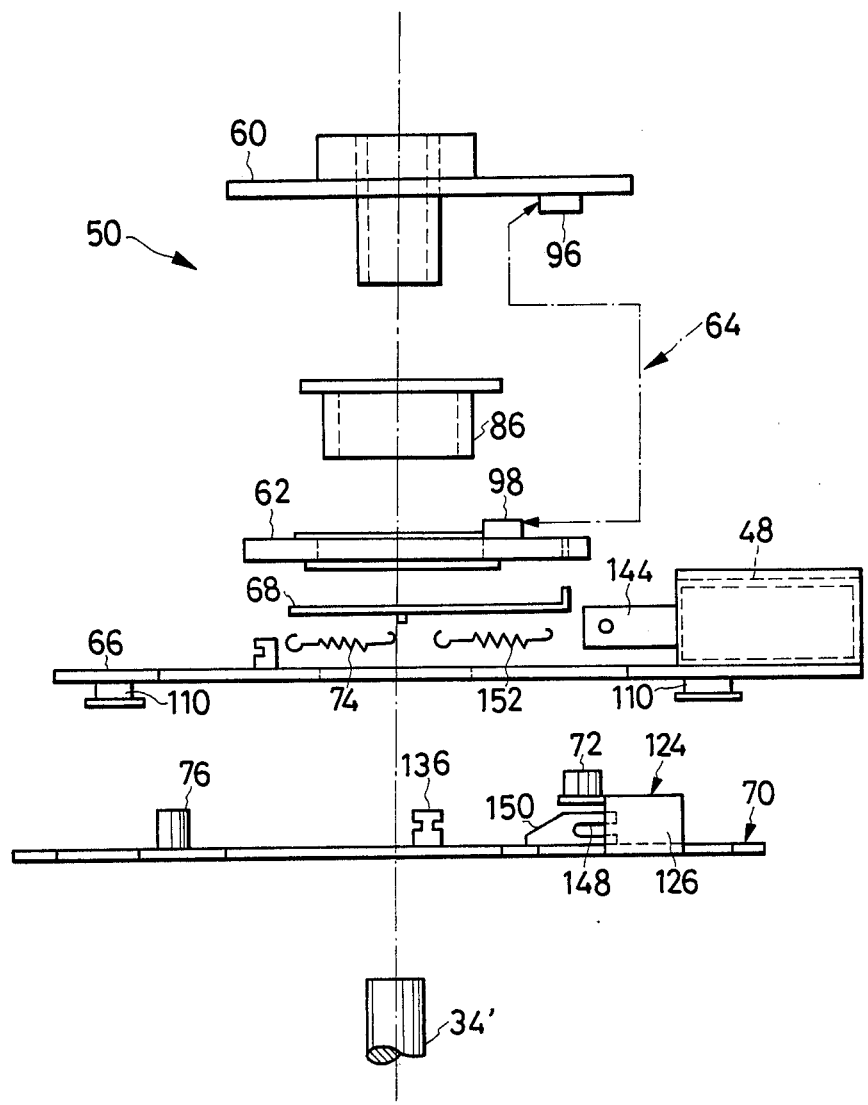
FIG. 4 is an exploded elevation of the retractor mechanism.

The configuration of the retractor mechanism 50 will become apparent from a study of FIGS. 2–4. Generally, the retractor mechanism 50 comprises:

1. A first rotary disk 60 firmly mounted on the output shaft extension 34' of the stepping motor 32.

2. A second rotary disk 62 loosely mounted on the output shaft extension 34' of the stepping motor 32.

3. One-way coupling or clutch means 64, FIGS. 2 and 4, for imparting the rotation of the first rotary disk 60, and therefore of the stepping motor 32, to the second rotary disk 62 when the transducers 18 are being transported from the landing tracks T-1 in the non-storage regions 22 of the magnetic disks 12 to the home tracks T-0 in their storage regions 20 for initialization.

4. A fixed mounting plate 66.

5. An energy storage element 68, shown as a flat spiral spring in this particular embodiment, mounted between a second rotary disk 62 and a mounting plate 66, and acted upon by the second rotary disk for storing energy during the transducer movement from landing tracks T-1 to home tracks T-0.

6. A lockpin carriage 70, mounted to the mounting plate 66, for linear movement in the right and left directions, relative to said mounting plate, as seen in FIGS. 2–4.

7. As best seen in FIG. 2, a first lockpin 72, on the lockpin carriage 70, engageable with the first rotary disk 60 when the transducers 18 are on the landing tracks T-1 (i.e. when the disk drive 10 is powered off), for locking the transducers in that position.

8. Resilient means, shown in FIGS. 2 and 4 as a helical tension spring 74, connected between mounting plate 66 and lockpin carriage 70 for holding the first lockpin 72 in locking engagement with the first rotary disk 60 when the transducers 18 are on the landing tracks T-1.

9. A second lockpin 76, on the lockpin carriage 70, capable of locking engagement with the second rotary disk 62 when the transducers 18 are moved to the home tracks T-0, or to their neighborhoods. This results in isolating the energy stored in the energy storage element 68 from the transducer positioning mechanism 23 during the progress of data transfer between magnetic disks 12 and transducers 18.

10. The solenoid 48, shown also in FIG. 1, connected between mounting plate 66 and lockpin carriage 70, for reciprocal movement of the latter relative to the former, in order to move the lockpins 72 and 76 into and out of locking engagement with the first and second rotary disks 60 and 62 respectively.

The following, under the respective headings, is a more detailed discussion of the above listed components of the transducer retractor mechanism 50.

2-1. First Rotary Disk

Figure 5:
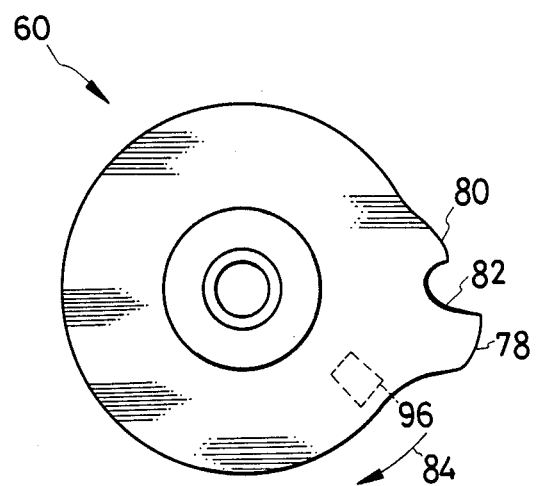
FIG. 5 is a plan view showing one side of the first rotary disk included in the retractor mechanism.
Figure 6:
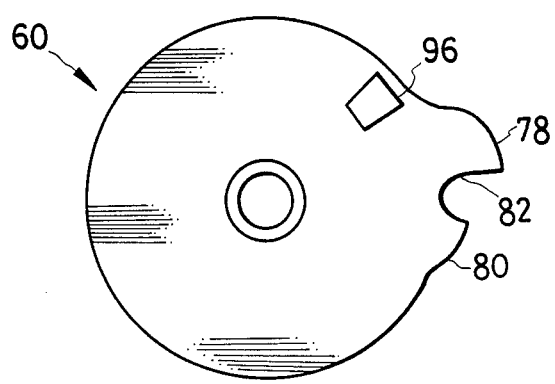
FIG. 6 is a plan view showing the other side of the first rotary disk of FIG. 5.

The first rotary disk 60 is shown in detail in FIGS. 5 and 6. It will be seen that the first rotary disk 60 is generally circular in shape except for a relatively large protuberance 78 and a smaller protuberance 80, both protruding radially and outwardly from the periphery of the first rotary disk, and a recess 82 delocated between the two protuberances.

As will be best understood from FIG. 2, the first lockpin 72 is engaged in the recess 82 in the first rotary disk 60 when the transducers 18 are on the landing tracks T-1 on the magnetic disks 12. As indicated by the arrow 84 in FIG. 2, the output shaft 34 and its extension 34' must rotate in a clockwise direction for inducing the displacement of the transducers 18 in the radially outward direction of the magnetic disks 12. Being mounted tightly on the stepping motor output shaft extension 34', the first rotary disk 60, when engaged with the first lockpin 72 as in FIG. 2, locks the transducers 18 on the landing tracks T-1.

The protuberance 78, on the first rotary disk 60, is designed larger than the other protuberance 80 so as to abut against the first lockpin 72. The transducers 18 are positioned on the landing tracks T-1 when the protuberance 78 abuts against the first lockpin 72.

2-2. Second Rotary Disk

As will be seen from FIGS. 2 and 4, the second rotary disk 62 is mounted so that it can rotate on a sleeve 86 which in turn is rigidly mounted on the mounting plate 66 and which concentrically surrounds the stepping motor output shaft extension 34' with a clearance in between. Thus the first and second rotary disks 60 and 62 are concentric with respect to each other, although the first rotary disk does not rotate relative to the shaft extension 34' whereas the second rotary disk can rotate relative to the shaft extension.

Figure 7:
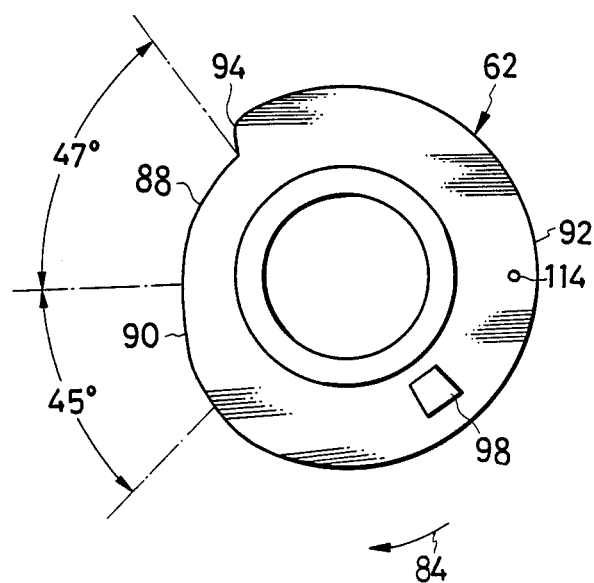
FIG. 7 is a plan view of the second rotary disk included in the retractor mechanism.

FIG. 7 is a detailed illustration of the second rotary disk 62. This second rotary disk has a contoured periphery for acting as a cam on the second lockpin 76. Accordingly, the second lockpin 76 functions not only as a lock for the second rotary disk 62 against rotation, but also as a cam follower acted upon by the second rotary disk 62 for a purpose to be described subsequently.

The contoured periphery of the second rotary disk 62 includes a smaller diameter portion 88 extending through an angle of approximately 47 degrees about the axis of the second rotary disk, a varying diameter portion 90 extending through an angle of approximately 45 degrees, a larger diameter portion 92, and a somewhat rounded step 94 between the larger diameter portion and the smaller diameter portion. The varying diameter portion 90 gradually increases in diameter as it extends from the smaller diameter portion 88 to the larger diameter portion 92, resulting in the smooth relative travel of the second lockpin 76 from the smaller diameter portion to the larger diameter portion. When the transducers 18 are transported to the preassigned outermost positions on the storage regions 20 of the magnetic disks 12 for initialization, the second lockpin 76 engages the step 94 for locking the second rotary disk 62 against rotation in a counterclockwise direction, as viewed in FIG. 2, and hence for saving the energy stored in the energy storage element 68.

2-3. One-way Coupling

The one-way coupling or clutch means 64 comprises a first projection 96, FIGS. 5 and 6, formed eccentrically on one surface of the first rotary disk 60, and a second projection 98, FIG. 7, formed eccentrically on one surface of the second rotary disk 62.

As will be seen from FIG. 2, the two projections 96 and 98 are capable of abutting engagement with each other. The first rotary disk 60 rotates in the clockwise direction 84 from its FIG. 2 position during the radially outward travel of the transducers 18 from landing tracks T-1 toward home tracks T-0 over the magnetic disks 12 for initialization. During such rotation of the first rotary disk 60, the first projection 96 thereon abuts on the second projection 98, on the second rotary disk 62, thereby imparting the rotation of the first rotary disk to the second rotary disk for the storage of energy in the spiral spring 68. Also, during the counterclockwise rotation of the second rotary disk 62 and due to the energy stored in the spiral spring 68, the second projection 98, on the second rotary disk, abuts on the first projection 96, on the first rotary disk 60, thereby imparting the rotation of the second rotary disk to the first rotary disk which induces the retraction of the transducers 18 to the landing tracks T-1.

2-4. Mounting plate

Figure 8:
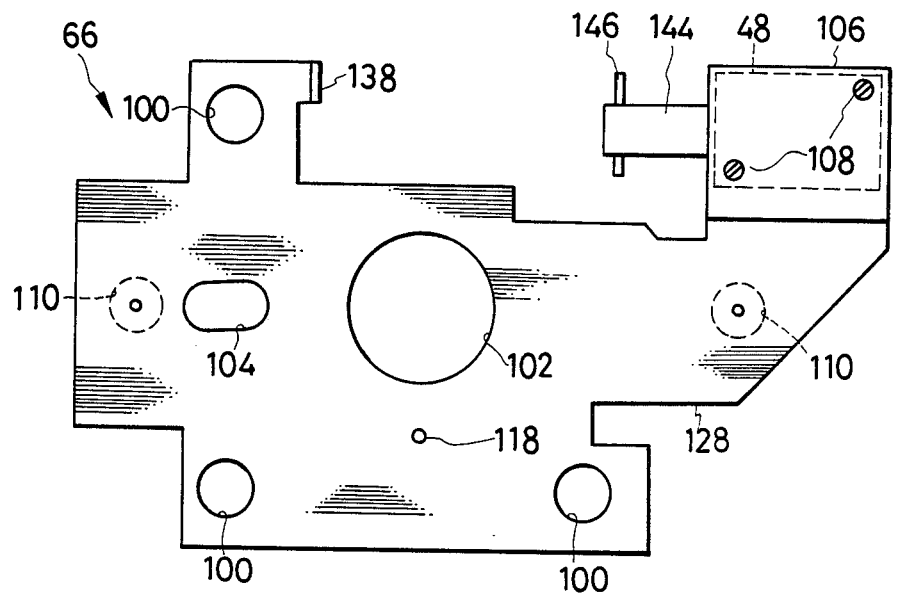
FIG. 8 is a plan view of the mounting plate included in the retractor mechanism.

With reference to FIG. 8 the mounting plate 66 can be a punched metal sheet. It has three mounting holes 100 for the passage of fastener elements, not shown, by which the mounting plate 66 is fastened to the frame, not shown, of the disk drive 10. Located approximately in the center of the mounting plate 66, is a hole 102 for snugly receiving the sleeve 86, FIGS. 3 and 4, which loosely surrounds the stepping motor shaft extension 34'. A slot 104, adjacent to the hole 102, permits the second lockpin 76, on the lockpin carriage 70, to loosely extend through the said slot for movement into and out of engagement with the second rotary member 62. A solenoid housing 106 formed integral with the mounting plate 66 has the solenoid 48 mounted therein and secured thereto as by means of screws 108.

As will be seen also from FIGS. 3 and 5, the mounting plate 66 is further provided with a pair of headed guide pins 110 on its side directed toward the stepping motor 32 and away from the rotary disks 60 and 62 and so forth. These guide pins serve the purpose of guiding the linear reciprocation of the lockpin carriage 70, as will be later explained in more detail in connection with the detailed description of the lockpin carriage.

2-5. Energy Storage Element

Figure 9:
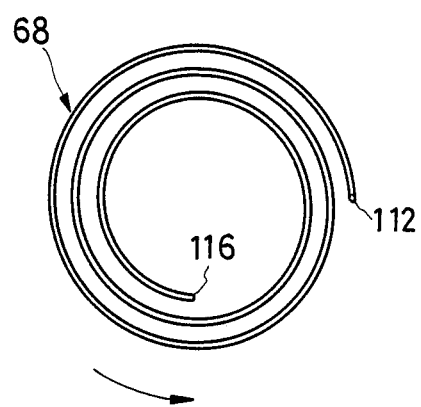
FIG. 9 is a plan view of the flat spiral spring included as the energy storage element in the retractor mechanism.

The energy storage element takes the form of the flat spiral spring 68, FIG. 9, in this particular embodiment. Mounted between second rotary disk 62 and mounting plate 66, the spiral spring 68 has a first extremity 112 engaged in an eccentric hole 114, FIG. 7, in the second rotary disk, and a second extremity 116 engaged in a hole 118, FIG. 8, in the mounting plate.

As indicated by the dashed line in FIG. 2, the spiral spring 68 is so wound that, upon rotation of the second rotary disk 62 in the direction of the arrow 84, the sprial spring is subjected to a torque tending to close the gaps between its turns. Because it is wound up to a shorter radius of curvature, the spiral spring 68 stores energy as a function of the rotary displacement of the second rotary disk 62.

2-6. Lockpin Carriage

Figure 10:
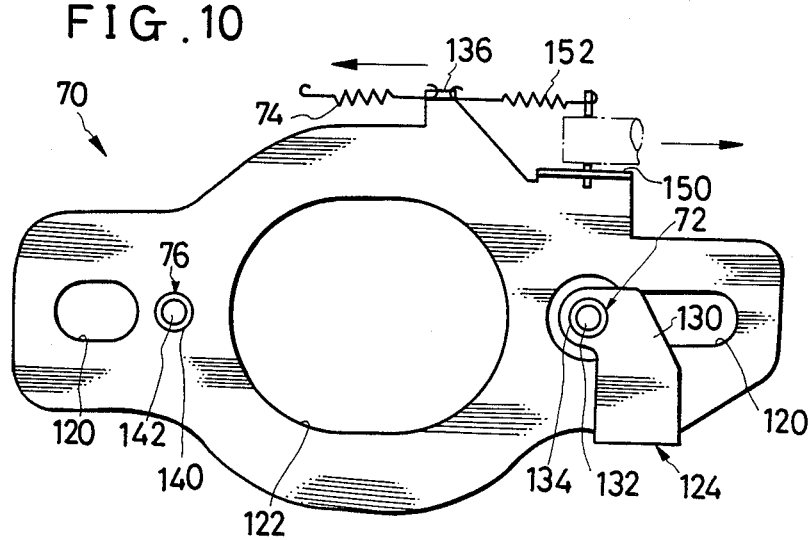
FIG. 10 is a plan view of the lockpin carriage included in the retractor mechanism.

With reference to FIG. 10, the lockpin carriage 70 is a punched metal sheet having located therein a pair of aligned guide slots 120 for slidably receiving the headed guide pins 110 on the mounting plate 66. The lockpin carriage 70 is thus guided for linear reciprocation in the direction in which the two lockpins 72 and 76 thereon are aligned. The enlarged heads of the guide pins 110 serve for holding the lockpin carriage 70 against detachment from the mounting plate 66.

Placed centrally in the lockpin carriage 70, is a large clearance hole 122 for the passage of the stepping motor shaft extension 34'. This hole 122 is large enough to enable the linear reciprocation of the lockpin carriage 70 without interference with the stepping motor shaft extension 34'.

2-7. First Lockpin

As will be noted from both FIGS. 4 and 10, the first lockpin 72 is mounted on a support arm 124 formed in one piece with the lockpin carriage 70. The support arm 124 comprises a first portion 126, FIG. 4, bent perpendicularly from the principal plane of the lockpin carriage 70, and extending through a recess 128, FIG. 8, in the fixed mounting plate 66, and a second portion 130, bent perpendicularly from the first portion 126 and lying between the first and second rotary disks 60 and 62. The first lockpin 72 is mounted on this second portion 130 of the support arm 124, for movement into and out of locking engagement with the periphery of the first rotary disk 60 and in parallel with the reciprocation of the lockpin carriage 70. FIG. 10 shows that the first lockpin 72 is comprised of a shaft 132, rigidly erected on the support arm 124, and a roll 134, mounted so that it can rotate on the shaft 132, for movement into and out of the recess 82 in the first rotary disk 60 with a minimum of friction.

2-8. Resilient Means

As the resilient means for holding the first lockpin 72 in locking engagement with the first rotary disk 60 when the transducers 18 are retracted on the landing tracks T-1 on the magnetic disks 12, we have employed the helical tension spring 74 shown in FIGS. 2, 4 and 10. FIGS. 2 and 10 clearly illustrate that the tension spring 74 has its first extremity engaged with a spring retainer 136 integral with the lockpin carriage 70. The second extremity of the tension spring 74 is engaged with a spring retainer 138, FIGS. 2 and 8, integral with the mounting plate 66. Thus the tension spring 74 acts between mounting plate 66 and lockpin carriage 70, biasing the first lockpin 72 into locking engagement with the first rotary disk 60.

2-9. Second Lockpin

As shown in FIG. 10, the second lockpin 76 is mounted directly on the major portion of the lockpin carriage 70. Extending with clearance through the slot 104, FIG. 8, in the mounting plate 66, the second lockpin 76 terminates short of the plane of the first rotary disk 60 for movement into and out of engagement with only the second rotary disk 62. FIG. 10 further shows that the second lockpin 76 comprises a roll 140, mounted so that it can rotate on a fixed shaft 142 on the lockpin carriage 70. The second lockpin 76 is therefore capable of rolling over the contoured periphery of the second rotary disk 62.

2-10. Solenoid

With reference to FIGS. 2, 4 and 8, the solenoid 48 has a plunger 144 having a crosspin 146 secured mounted thereto. One end of the crosspin 146 is slidably engaged in a guide slot 148, FIG. 4, in the guide portion 150 of the lockpin carriage 70. The other end of the crosspin 146 is engaged with one extremity of a helical tension spring 152, the other extremity of which is hooked onto the spring retainer 136 integral with the lockpin carriage 70.

Accordingly, the two tension springs 74 and 152 act in the opposite directions. The tensile force F1 of the first tension spring 74 is greater than that F2 of the second tension spring 152, holding the lockpin carriage 70 in the FIG. 2 position when the solenoid 48 is unenergized. With the lockpin carriage 70 thus held in the FIG. 2 position, the first lockpin 72 is in locking engagement with the first rotary disk 60 for locking the transducers 18 on the landing tracks T-1 on the magnetic disks 12. The solenoid 48, on becoming energized, acts together with the second recited tension spring 152 to pull the lockpin carriage 70 to the right, as seen in FIG. 2, against the force of the first tension spring 74, thereby unlocking the first rotary disk 60 from the first lockpin 72.

3. Operation

The transducer retractor mechanism 50, in accordance with our invention, functions to mechanically lock the transducers 18 on the landing tracks T-1 on the magnetic disks 12 during the shipment of the disk drive 10, as well as when the disk drive is not powered in use. When the disk drive 10 is powered on, the retractor mechanism 50 permits the initialization of the transducer positions in the well known manner. Further, during the subsequent process of data transfer, the retractor mechanism 50 imposes little or no load on the transducer positioning mechanism 23. Still further, when the disk drive 10 is powered off, the retractor mechanism operates to retract the transducers 18 onto the landing tracks T-1. Thus, in view of such a diversity of the operational features of the retractor mechanism 50, we will discuss its operation under several headings.

3-1. Locking of Transducers

FIG. 2 is configured so that the transducers 18 are locked on the landing tracks T-1, with the solenoid 48 unenergized because the disk drive 10 is not powered. The first lockpin 72 on the lockpin carriage 70 is engaged in the recess 82 in the first rotary disk 60 under the force of the first tension spring 74 acting between the fixed mounting plate 66 and lockpin carriage 70.

Mechanically, as will be understood by referring also to FIG. 1, the transducers 18 are rigidly connected to the first rotary disk 60. As the first rotary disk 60 is locked against rotation, so are the transducers 18 against linear displacement from the landing tracks T-1 onto the data storage region 20 on the magnetic disks 12. The data storage tracks T-0 through T-n in the storage region 20 are therefore protected from damage by the transducers 18 despite the vibrations or shocks that may be applied to the disk drive 10 during its shipment or handling.

3-2. Initialization of Transducer Positions

As is standard with this type of disk drive, the transducers 18 are automatically initialized on the home tracks T-0 on the magnetic disks 12 immediately after the disk drive is electrically turned on. The magnetic disks 12 are set into rotation upon delivery of supply voltage to the supply terminal 46 from the unshown host device. The transducers 18 do not start immediately flying over the magnetic disks 12 when the magnetic disks 12 starts to rotate, but after a pre-set time interval. Although the transducers slider over the landing tracks T-1 during that time, the resulting possible damage to the magnetic disks are negligible since the landing tracks are on the non-storage regions 22. As is well known in the art, the stepping motor control and drive circuit 40 is constructed to commence the initialization control of the transducer positions after the transducers 18 have pneumatically moved out of contact with the magnetic disks 12, in order to avoid the sliding of the transducers over the data storage regions 20.

However, the solenoid 48, of the transducer retractor mechanism 50, becomes energized immediately upon delivery of supply voltage to the terminal 46. The solenoid 48, on energization, acts together with the second tension spring 152 to pull the lockpin carriage 70 to the right, as viewed in FIG. 2, against the force of the first tension spring 74. Thereupon the two lockpins 72 and 76 on the lockpin carriage 70 will travel from the positions of FIG. 2 to those depicted in FIG. 11 with respect to the two rotary disks 60 and 62 on the stepping motor shaft extension 34'. Now, unlocked from the first lockpin 72, the first rotary disk 60 is free to rotate in the direction of the arrow 84. The second lockpin 76 is now held against the contoured periphery of the second rotary disk 62, ready for the rolling movement thereover.

After the transducers 18 have started flying over the landing tracks T-1, the control and drive circuit 40 will start energizing the stepping motor 32 for moving the transducers 18 from the landing tracks T-1 to the home tracks T-0 for initialization. The resulting rotation of the stepping motor output shaft 34 will be imparted to the first rotary disk 60, having been unlocked from the first lockpin 72, which is mounted securely on the shaft extension 34'. Thus the first rotary disk 60 will rotate in the direction of the arrow 84 from its FIG. 11 position to that of FIG. 12. The one-way coupling means 64 transmits this rotation of the first rotary disk 60 to the second rotary disk 62, resulting in the storage of energy in the spiral spring 68.

Figure 11:
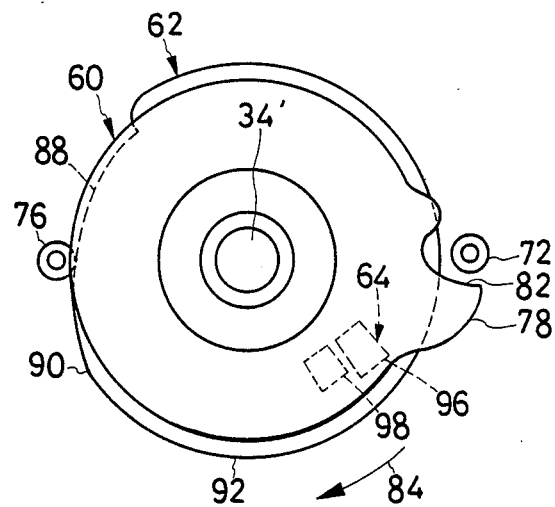
FIG. 11 is a plan view showing the first and second rotary disks and first and second lockpins, all included in the retractor mechanism, in their relative positions when the first rotary disk is unlocked with the transducer, not shown here, on the non-storage region of the magnetic disk of FIG. 1.
Figure 12:
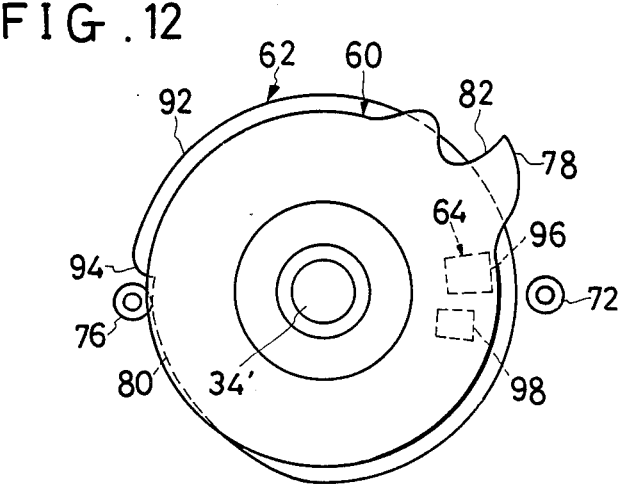
FIG. 12 is a view similar to FIG. 11 except that the first and second rotary disks are shown in their positions with respect to the first and second lockpins when the transducer, not shown here, is transported to the home track on the magnetic disk of FIG. 1.

Usually, in this type of disk drive, the Track Zero sensor 52 puts out a signal indicative of the transducer positions on the homer tracks T-0 upon rotation of the stepping motor shaft extension 34' through an angle of approximately 310 degrees from the position of FIG. 11 to that of FIG. 12. The control and drive circuit 40 responds to this output signal of the Track Zero sensor 52 by stopping the rotation of the stepping motor 32 in order to hold the transducers 18 on the home tracks. Then the second lockpin 76 will be urged into locking engagement with the second rotary disk 62 by the resultant of the forces of the solenoid 48 and second tension spring 152. With the second rotary disk 62 thus locked against rotation in a counterclockwise direction as viewed in FIG. 12, the energy that has been stored in the spiral spring 68 during the joint clockwise rotation of the two rotary disks 60 and 62 will be isolated from the first rotary disk.

However, it is possible for the control and drive circuit 40 to fail to position the transducers 18 exactly on the home tracks, in response to the output from the Track Zero sensor 52, due, for example, to the unavoidable dimensional errors of the parts making up the transducer positioning mechanism 23 and Track Zero sensor 52. In that case, as is well known to those versed in the disk drive art, the transducers 18 will have to be transported, radially and outwardly from the magnetic disks 12, a certain distance (typically 10 times the pitch of the data storage tracks) beyond the home tracks T-0. Such outward movement of the transducers 18 requires the rotation of the stepping motor shaft extension 34', together with the first rotary disk 60 thereon, in a clockwise direction from the position of FIG. 12.

It is toward this end that the second rotary disk 62 has the contoured cam periphery for acting upon, and being acted upon by, the second lockpin 76. We will now explain how the second rotary disk 62 and lockpin 76 cooperate to make possible the movement of the transducers 18 radially and outwardly from the magnetic disks 12 beyond the home tracks T-0 without being loaded by the spiral spring 68 after the rotation of the first rotary disk 60 has been arrested in the FIG. 12 position.

When the second rotary disk 62 is in the position of FIG. 11, that is, when the transducers 18 are on the landing track T-1, the second lockpin 76 contacts the contoured periphery of the second rotary disk in the neighborhood of the boundary between its smaller diameter portion 88 and varying diameter portion 90. As the second rotary disk 62 starts revolving toward the FIG. 12 position together with the first rotary disk 60, the second lockpin 76 will roll over the varying diameter portion 90 of the second rotary disk and will be thereby forced to the left as viewed in FIG. 11.

As will be seen by referring again to FIG. 2 or 10, the lockpin carriage 70 is also biased to the left by the first tension spring 74. The resultant of the force of this first tension spring 74 and the force of the stepping motor 32, tends to move the second lockpin 76 to the left and is greater than the resultant of the rightward forces being exerted on the lockpin carriage 70 by the solenoid 48 and second tension spring 152. Consequently, the lockpin carriage 70, with the second lockpin 76 thereon, will be slightly displaced to the left until the second lockpin comes to ride over the greater diameter portion 92 of the second rotary disk 62.

Then, just about when the first rotary disk 60 stops rotating, the second lockpin 76 will ride over the rounded step 94 of the second rotary disk 62 and fall onto its smaller diameter portion 88 as shown in FIG. 12. Being urged against the second rotary disk 62 by both the solenoid 48 and second tension spring 152, the second lockpin 76 on riding over the rounded step 94 will cause the second rotary disk to undergo angular displacement through an additional 4.5 degrees (corresponding to 10 track pitches) or so in a clockwise direction after the first rotary disk 60 has stopped with the stepping motor 32. It will thus be noted in FIG. 12 that the projection 98 on the second rotary disk 62 is slightly spaced in a clockwise direction from the projection 96 on the first rotary disk 60. Accordingly, if the stepping motor control and drive circuit 40 fails to position the transducers 18 exactly on the home tracks T-0 by the output from the Track Zero sensor 52, the stepping motor 32 may be re-energized for moving the transducers further radially and outwardly from the home tracks to the extent permitted by the angular spacing between the projections 96 and 98 on the rotary disks 60 and 62.

It should also be noted in connection with FIG. 12 that the second lockpin 76 is in positive locking engagement with the second rotary disk 62 upon completion of transducer position initialization, thereby saving the energy that has been stored in the sprial spring 68 during the clockwise rotation of the second rotary disk.

3-3. Data Transfer

With the transducers 18 positioned on the home tracks T-0 as stated above, the disk drive 10 is ready for the commencement of data transfer between magnetic disks 12 and transducers 18. The first lockpin 72 is now held at a distance from the first rotary disk 60. Accordingly, the one-way coupling 64 permits the rotation of the first rotary disk 60, and therefore of the stepping motor 32; the rotation being at least through the angle required for transducer access to any of the data storage tracks T-0 through T-n on the magnetic disks 12. As the unshown host device supplies the stepping signal and stepping direction signal by way of the lines 42 and 44, the control and drive circuit 40 will respond by correspondingly energizing the stepping motor 32 for accessing the transducers 18 to the desired data storage tracks on the magnetic disks 12.

It should be appreciated that the energy that has been stored in the spiral spring 68 remains isolated from the stepping motor 32 during its rotation for transporting the transducers from track to track on the magnetic disks 12. All that is left coupled to the stepping motor shaft extension 34' during the progress of data transfer is in the first rotary disk 60 together with the projection 96 thereon. Thus, despite the provision of the retractor mechanism 50, the conventional positioning mechanism 23 will operate, for accessing the transducers 18 to the desired tracks, at least as quickly and precisely as heretofore.

3-4. Retraction of Transducers

The solenoid 48 will be deenergized at the same time as the disk drive motor 16 when the disk drive 10 is powered off, which occurs at the completion of the data transfer or in the event of a power failure. The magnetic disks 12 will not come to an immediate stop upon deenergization of the disk drive motor 16, but will continue rotation by inertia, holding the transducers 18 out of contact therewith for some time thereafter. The transducers 18 must be retracted to the landing tracks T-1 while still flying over the magnetic disks 12.

The force of the first tension spring 74 will overcome that of the second tension spring 152 upon deenergization of the solenoid 48, thus pulling the lockpin carriage 70 to the left as seen in FIG. 2. Thereupon, unlocked from the second lockpin 76, the second rotary disk 62 will start revolving from its FIG. 12 position to that of FIG. 2 by the energy that has been stored in the spiral spring 68. When the disk drive 10 is powered off, the transducers 18 will in all likelihood be on tracks other the home tracks T-0, so that the projection 96 on the first rotary disk 60 will be spaced some distance in a counterclockwise direction from the projection 98 on the second rotary disk 62. However, the projection 98 will come into abutting engagement with the projection 96 soon after the second rotary disk 62 starts revolving counterclockwise from its FIG. 12 position. Thereafter the two rotary disks 60 and 62 will revolve jointly and return simultaneously to the positions of FIG. 2.

The lockpin carriage 70 has already been displaced to the left by the first tension spring 74. Therefore, immediately before the rotary disks 60 and 62 return to the initial positions of FIG. 2, the first lockpin 72 on the lockpin carriage 70 will ride over the smaller protuberance 80, FIGS. 5 and 6, of the first rotary disk 60 and then will fall into the recess 82 under the force of the first tension spring 74. The other protuberance 78 of the first rotary disk 60 is so much larger than the protuberance 80, and is further so shaped, that the first lockpin 72 will positively engage this protuberance 78, preventing the rotation of the rotary disks 60 and 62 beyond the positions of FIG. 2 in opposition to their inertial forces and, possibly, to the energy remaining in the spiral spring 68.

The transducers 18 will return to the landing tracks T-1 on the magnetic disks 12 when the first rotary disk 60 reaches the FIG. 2 position. As the first rotary disk 60 is locked against rotation, so are the transducers 18 against radial linear displacement across the tracks of the magnetic disks 12.

We have confirmed that it takes less than one second for the retractor mechanism 50 of our invention to return the transducers 18 from any radial position on the storage regions 20 of the magnetic disks 12 to the positions over the landing tracks T-1 on the non-storage regions 22. This length of time is sufficiently short to accomplish the retraction of the transducers while they are still flying over the magnetic disks in Winchester disk drives of standard construction.

4. Alternate Embodiment

Figure 13:
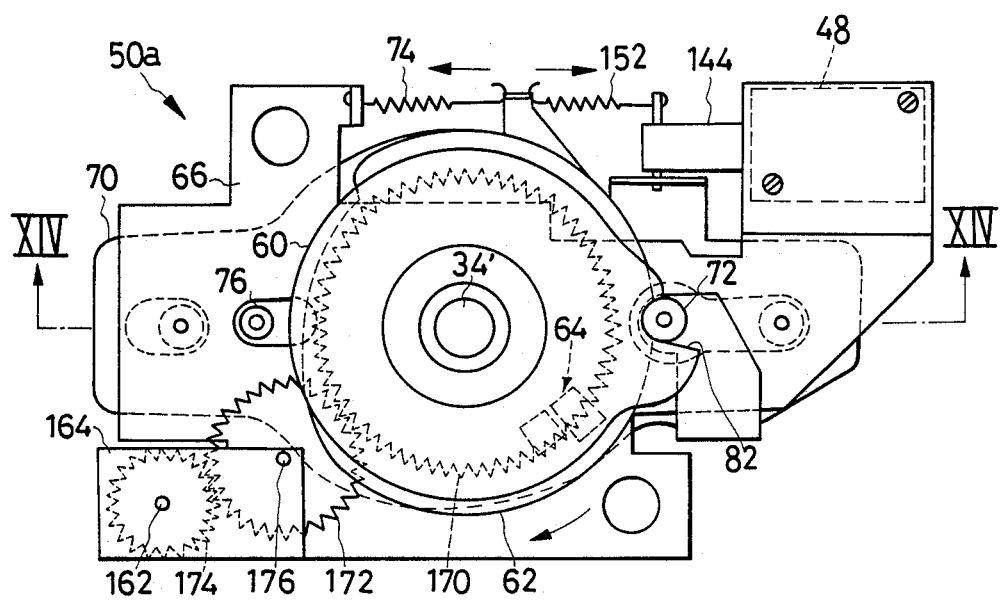
FIG. 13 is a view similar to FIG. 2 but showing an alternate form of transducer retractor mechanism in accordance with our invention.
Figure 14:
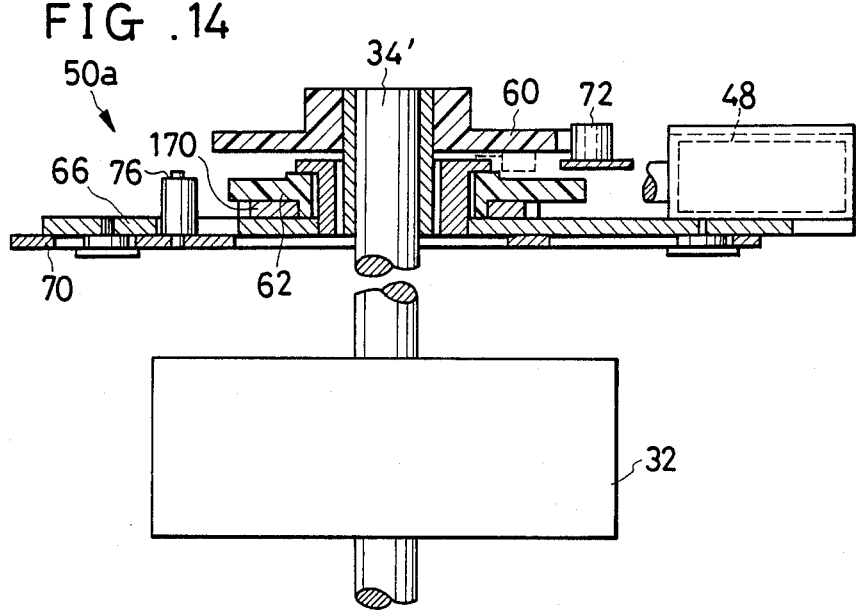
FIG. 14 is a section through the alternate retractor mechanism of FIG. 13, taken along the line XIV—XIV therein.
Figure 15:
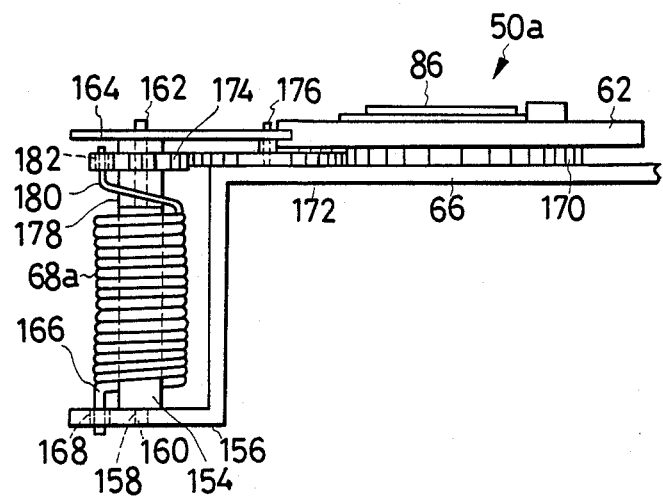
FIG. 15 is an elevation showing only those parts of the alternate retractor mechanism which differ from the retractor mechanism of FIGS. 2-12.
Figure 16:
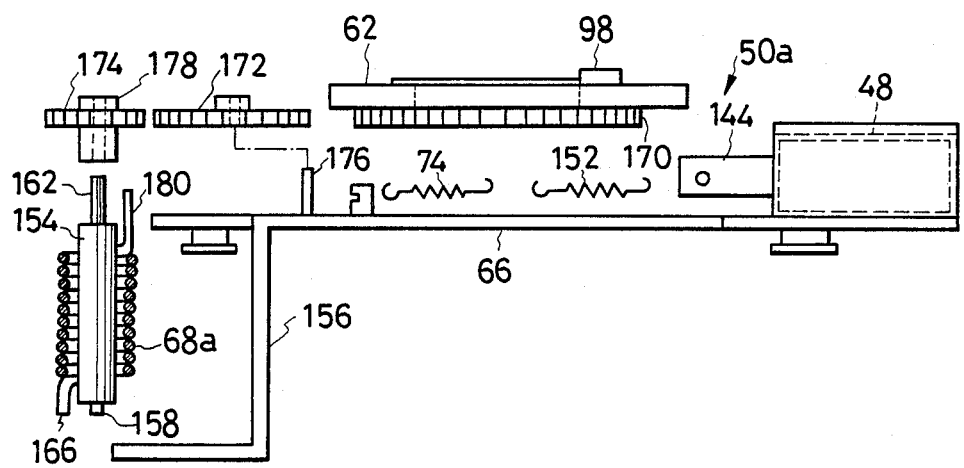
FIG. 16 is an exploded elevation of the parts shown in FIG. 15.

In an alternate transducer retractor mechanism 50a, shown in FIGS. 13-16, we have employed a coiled torsion spring 68a, FIGS. 15 and 16, as the energy storage element, in substitution for the sprial spring of the preceding embodiment. Being bulkier than the sprial spring, however, the coiled torsion spring 68a cannot possibly be mounted in the same position as the spiral spring without making the space requirement of the retractor mechanism inordinately large.

Therefore, in this alternate embodiment, the torsion spring 68a is sleeved with substantial clearance upon a mandrel 154 disposed in side-by-side relation to the stepping motor 32, FIG. 14. The mandrel 154 is immovably erected on an L-shaped spring mount 156, integral with the fixed mounting plate 66, by having a smaller diameter extension 158 at one end thereof pressfitted in a hole 160 in the spring mount. Another smaller diameter extension 162 of the mandrel 154, protruding from the other end thereof, is pressfitted in a hole in a retainer plate 164. One end 166 of the torsion spring 68a is engaged in a hole 168 in the spring mount 156.

In order to transmit the torque of the second rotary disk 62 to the torsion spring 68a for the storage of energy therein, we have employed in this embodiment a train of gears seen in FIGS. 13 15 and 16. The gear train comprises a drive gear 170, an idler gear 172 and a driven gear 174. The drive gear 170 is coaxially secured to the second rotary disk 62. The idler gear 172 is mounted so that it can rotate on a fixed shaft 176 extending between mounting plate 66 and retainer plate 164. The driven gear 174 has an integral sleeve 178 fitted so that it can rotate over the smaller diameter extension 162 of the mandrel 154. The retainer plate 164 serves the purpose of holding the idler gear 172 and driven gear 174 against detachment from the shaft 176 and mandrel extension 162 respectively.

FIG. 15 indicates that the end 180 of the torsion spring 68a is engaged in a hole 182 in the driven gear 174, the other end 166 of the spring being engaged as aforesaid in the hole 168 in the spring mount 156. The axial length of the coil of the torsion spring 68a must be sufficiently less than the spacing between spring mount 156 and driven gear 174 to permit its extension during the storage of energy therein.

This alternate transducer retractor mechanism 50a is akin in the other details of construction with the first disclosed retractor mechanism 50, as will be understood from a comparison of FIGS. 13 and 14 with FIGS. 2 and 3.

5. Operation of the Alternate Embodiment

As in the first disclosed embodiment, the one-way coupling or clutch means 64 imparts the clockwise rotation, as viewed in FIG. 13, of the first rotary disk 60 to the second rotary disk 62 during the travel of the transducers 18, FIG. 1, from the landing tracks T-1 to the preassigned outermost positions on the storage regions 20 of the magnetic disks 12 for initialization. The train of gears 170, 172 and 174 transmits this clockwise rotation of the second rotary disk 62 to the coiled torsion spring 68a, with the consequent storage of energy therein. The thus stored energy is saved during the subsequent run of data transfer as the second lockpin 76 locks the second rotary disk 62 against rotation in a counterclockwise direction under the force of the solenoid 48 being energized.

Also as in the first disclosed embodiment, the solenoid 48 becomes deenergized when the apparatus is powered off, as upon completion of a desired run of data transfer or in the event of a power failure. Thereupon, unlocked from the second lockpin 76, the second rotary disk 62 rotates counterclockwise, as viewed in FIG. 13, by the energy supplied from the torsion spring 68a via the train of gears 170, 172 and 174. The transducers will return to and land on the landing tracks on the magnetic disks as the second rotary disk 62 returns to the FIG. 13 position.

Despite the greater space requirement of the coiled torsion spring 68a than that of the flat spiral spring 68, the torsion spring offers the advantage of more reliable operation. We have found that the spiral spring is susceptible to the entanglement of its turns in operation. Being absolutely free from this drawback, the coiled torsion spring can more reliably perform its intended functions over an extended period of time.

6. Possible Modifications

We understand that our invention finds application to data transfer devices other than the Winchester drive dislcosed herein, including those in which the transducer or transducers are in constant contact with the disk or disks even when the apparatus is in or out of operation. Furthermore, although we have shown and described our invention in terms of only two preferable embodiments thereof, we recognize that our invention could be embodied in other forms within the broad teaching hereof. The following is a brief list of possible modifications or alterations of the above disclosed embodiments which we believe fall within the scope of our invention:

1. A voice coil motor may be employed in lieu of the stepping motor, with the voice coil motor coupled to a swing arm for accurately transporting the transducer mounted thereto. The retractor mechanism of our invention may be coupled to a shaft which can rotate with the swing arm.

2. A direct current motor may be employed in substitution for the stepping motor.

3. The transducer may be retracted to a non-storage region provided radially and outwardly from the data storage region, instead of to the non-storage region radially inward from the data storage region as in the illustrated embodiment.

4. The first and second rotary disks, or equivalent rotary members, may not be coaxial; instead, the second rotary disk may rotate about a shaft different from the stepping motor output shaft. The two shafts may be interconnected by gearing or other power transmission means, and means may also be provided for disconnecting the shafts as required.

5. Instead of revolving the second rotary disk through the required additional angle by providing the contoured cam edge acting on the second lockpin, permanent magnet means may be provided on the second rotary disk and the mounting plate, in such relative positions that the second rotary disk will rotate the required additional angle after the first rotary disk has stopped in the Track Zero position.

6. The contoured cam edge of the second rotary disk, as well as the noted permanent magnet means, will be unnecessary if the transducer can be stopped exactly on the home track for initialization.

7. Instead of the spiral spring or torsion spring acted upon by the second rotary disk, a helical tension spring may be connected between the transducer carriage and a stationary part via a connect-disconnect coupling which is controlled by a solenoid or the like. The tension spring may be disconnected from the transducer carriage by the coupling after energy has been stored therein by the travel of the transducer in the radially and outward direction of the record medium. The transducer will be retracted radially inward from the record medium as the tension spring is reconnected to the transducer carriage by the coupling when the apparatus is electrically turned off.

8. The transducer position may be initialized on the home track by the delivery of a prescribed number of stepping pulses from the host equipment to the stepping motor control and drive circuit.

9. The transducer position may be initialized on any track other than Track Zero.

What we claim is:

1. A data transfer apparatus of the type including a transducer for data transfer with a disklike record medium having a data storage region and a non-storage region arranged concentrically on one face thereof, and a transducer positioning mechanism for transporting the transducer across the storage and non-storage regions of the record medium, wherein the improvement resides in a transducer retractor mechanism coacting with the transducer positioning mechanism for retracting the transducer onto the non-storage region of the record medium as when the data transfer apparatus is electrically turned off, the transducer retractor mechanism comprising:

(a) energy storage means including an energy storage element;

(b) clutch means coupling the energy storage means to the transducer positioning mechanism for storing energy in the energy storage element when the transducer is moved from the non-storage region to the storage region of the record medium;

(c) locking means acting, when the transducer is moved from the non-storage region of the record medium to a preassigned position on the storage region thereof, on the energy storage means for locking the same against the release of the energy stored in the energy storage element, the clutch means permitting the transducer positioning mechanism to transport the transducer across the storage region of the record medium as long as the locking means is acting on the energy storage means; and (d) unlocking means for unlocking the energy storage means from the locking means and, in consequence, for permitting the energy storage means to act on the transducer positioning mechanism via the clutch means for returning the transducer from the storage region to the non-storage region by virtue of the energy that has been stored in the energy storage element.

2. The data transfer apparatus of claim 1 further comprising:

(a) second locking means acting on the transducer positioning mechanism for locking the transducer on the non-storage region of the record medium when the apparatus is electrically turned off;

(b) the unlocking means being coupled to the second locking means for unlocking the transducer therefrom when the apparatus is electrically turned on.

3. The data transfer apparatus of claim 1 wherein the energy storage element is a spring.

4. A data transfer apparatus for use with a disklike record medium having a data storage region and a non-storage region arranged concentrically on one face thereof, comprising:
   (a) a transducer for data transfer with the record medium;
   (b) a transducer positioning mechanism including a bidirectional transducer positioning motor for transporting the transducer across the storage and non-storage regions of the record medium;
   (c) a first rotary member coupled to the transducer positioning motor for joint rotation therewith;
   (d) a second rotary member;
   (e) clutch means for coupling the first rotary member to the second rotary member only during the movement of the transducer from the non-storage region to the storage region of the record medium in order to impart the rotation of the first rotary member to the second rotary member;
   (f) an energy storage element coupled to the second rotary member for storing energy as a function of the rotary displacement of the second rotary member during the movement of the transducer from the non-storage region to the storage region of the record medium;
   (g) a first locking member engageable with the first rotary member when the transducer is on the non-storage region of the record medium, for locking the transducer against movement with respect to the record medium;
   (h) a second locking member engageable with the second rotary member when the transducer is moved from the non-storage region of the record medium to a preassigned position on the storage region thereof by the transducer positioning mechanism, for locking the second rotary member against rotation and hence for isolating the energy stored in the energy storage element from the transducer positioning mechanism, the clutch means permitting the transducer positioning mechanism to transport the transducer across the storage region of the record medium as long as the second rotary member is locked by the second locking member; and
   (i) unlocking means for unlocking the first rotary member from the first locking member when the apparatus is electrically turned on, in order to permit the transducer positioning mechanism to transport the transducer from the non-storage region to the storage region of the record medium, and for unlocking the second rotary member from the second locking member when the apparatus is turned off, in order to permit the second rotary member to act, via the clutch means, on the first rotary member and thence on the transducer positioning mechanism for returning the transducer from the storage region to the non-storage region of the record medium by virtue of the energy stored in the energy storage element.

5. The data transfer apparatus of claim 4 wherein the unlocking means comprises a solenoid.

6. A data transfer apparatus for use with a disklike record medium having a data storage region and a non-storage region arranged concentrically on one face thereof, comprising:
   (a) a transducer for data transfer with the record medium;
   (b) a transducer positioning mechanism including a bidirectional transducer positioning motor for transporting the transducer across the storage and non-storage regions of the record medium;
   (c) a first rotary member rigidly mounted on an output shaft of the transducer positioning motor for joint rotation therewith;
   (d) a second rotary member loosely mounted on the output shaft of the transducer positioning motor;
   (e) one-way coupling means coupling the first rotary member to the second rotary member for imparting the rotation of the former to the latter during the movement of the transducer from the non-storage region to the storage region of the record medium;
   (f) a fixed member immovable with respect to the transducer positioning motor;
   (g) an energy storage element mounted between the second rotary member and the fixed member and acted upon by the second rotary member for storing energy during the movement of the transducer from the non-storage region to the storage region of the record medium;
   (h) a lockpin carriage mounted to the fixed member and constrained to linear reciprocation relative to the same;
   (i) a first lockpin rigidly mounted on the lockpin carriage for engagement with the first rotary member when the transducer is on the non-storage region of the record medium, for locking the transducer against movement with respect to the record medium;
   (j) resilient means acting between the fixed member and the lockpin carriage for biasing the latter in a first direction for holding the first lockpin in engagement with the first rotary member when the transducer is on the non-storage region of the record medium;
   (k) a second lockpin mounted on the lockpin carriage for engagement with the second rotary member when the transducer is moved by the transducer positioning mechanism to a preassigned position on the storage region of the record medium, for locking the second rotary member against rotation and hence for isolating the energy stored in the energy storage element from the transducer position mechanism, the one-way coupling means permitting the transducer positioning mechanism to transport the transducer across the storage region of the record medium as long as the second rotary member is locked by the second lockpin; and
   (l) a solenoid connected between the fixed member and the lockpin carriage, the solenoid when energized moving the lockpin carriage in a second direction, opposite to the first direction, against the force of the resilient means both for moving the second lockpin into engagement with the second rotary member and for unlocking the first rotary member from the first locking member in order to permit the transducer positioning mechanism to transport the transducer from the non-storage region to the storage region of the record medium, the solenoid when deenergized permitting the lockpin carriage to be moved in the first direction under the bias of the resilient means both for moving the first lockpin into engagement with the first rotary member and for unlocking the second rotary member from the second locking member in order to permit the second rotary member to act, via the one-way coupling means, on the first rotary member and thence on the transducer positioning mechanism for returning the transducer from the storage region to the non-storage region of the record medium by virtue of the energy that has been stored in the energy storage element.

7. The data transfer apparatus of claim 6 wherein the energy storage element is a spiral spring having one end anchored to the second rotary member and another end anchored to the fixed member.

8. The data transfer apparatus of claim 6 wherein the energy storage element is a coiled torsion spring.

9. The data transfer apparatus of claim 8 wherein the coiled torsion spring is sleeved upon a mandrel mounted to the fixed member in parallel spaced relation to the output shaft of the transducer positioning mechanism, and wherein the apparatus further comprises power transmission means connecting the second rotary member to the coiled torsion spring for storing energy in the latter.

10. The data transfer apparatus of claim 6 wherein the one-way coupling means comprises:
(a) a first projection formed eccentrically on the first rotary member; and
(b) a second projection formed eccentrically on the second rotary member;
(c) the first projection engaging the second projection for imparting the rotation of the first rotary member to the second rotary member during the movement of the transducer from the non-storage region to the storage region of the record medium;
(d) the second projection engaging the first projection for imparting the rotation of the second rotary member to the first rotary member during the return of the transducer from the storage region to the non-storage region of the record medium by the energy that has been stored in the energy storage element.

11. The data transfer apparatus of claim 6 wherein the record medium has a plurality of concentric data storage tracks, including an outermost home track, formed in the storage region thereof, with the non-storage region disposed radially and inwardly from the storage region, wherein the preassigned position is on the home track, and wherein the second rotary member has a contoured cam periphery for acting on the second lockpin so as to be thereby locked in such an angular position that the transducer is permitted to travel radially and outwardly from the storage medium beyond the home track.

* * * * *

UNITED STATES PATENT AND TRADEMARK OFFICE
CERTIFICATE OF CORRECTION

PATENT NO. : 4,816,942
DATED : Mar. 28, 1989
INVENTOR(S) : Takao Tanishima, et al.

It is certified that error appears in the above-identified patent and that said Letters Patent is hereby corrected as shown below:

Col., 1, line 27, change "again" to -- against --.

Col. 1, line 67, the first occurrence of "transfer" should be -- transducer --.

Col. 7, line 1, "delocated" should be -- located --.

Col. 9, line 53, "secured" should be -- securely --.

Col. 10, line 54, "slider" should be -- slide --.

Col. 16, line 9, the word "and" should be deleted.

Signed and Sealed this

Sixteenth Day of April, 1991

Attest:

HARRY F. MANBECK, JR.

Attesting Officer

Commissioner of Patents and Trademarks